United States Patent
Kuo et al.

(10) Patent No.: US 11,287,730 B2
(45) Date of Patent: Mar. 29, 2022

(54) WAVELENGTH CONVERTING DEVICE

(71) Applicant: DELTA ELECTRONICS, INC., Taoyuan (TW)

(72) Inventors: Po-Tsun Kuo, Taoyuan (TW); Yen-I Chou, Taoyuan (TW); Li-Cheng Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/144,166

(22) Filed: Jan. 8, 2021

(65) Prior Publication Data

US 2021/0349380 A1    Nov. 11, 2021

Related U.S. Application Data

(60) Provisional application No. 63/021,665, filed on May 7, 2020.

(51) Int. Cl.
*G03B 21/20* (2006.01)

(52) U.S. Cl.
CPC ......... *G03B 21/204* (2013.01); *G03B 21/208* (2013.01); *G03B 21/2066* (2013.01)

(58) Field of Classification Search
CPC ................................................. G03B 21/2066
See application file for complete search history.

(56) References Cited

U.S. PATENT DOCUMENTS

| 10,539,826 B2* | 1/2020 | Lee ................... G02F 1/133617 |
| 2016/0077415 A1 | 3/2016 | Motoya et al. |
| 2016/0218252 A1 | 7/2016 | Steckel et al. |

FOREIGN PATENT DOCUMENTS

| CN | 205282499 U | 6/2016 |
| CN | 208188568 U | 12/2018 |
| CN | 109976075 A | 7/2019 |
| CN | 110737085 A | 1/2020 |
| CN | 110873319 A | 3/2020 |
| TW | 201517327 A | 5/2015 |
| TW | 201928493 A | 7/2019 |

OTHER PUBLICATIONS

Po-Tsun Kuo et al., "Wavelength Conversion Element", U.S. Appl. No. 16/865,431, filed May 4, 2020.

\* cited by examiner

*Primary Examiner* — Vip Patel
(74) *Attorney, Agent, or Firm* — CKC & Partners Co., LLC (57) ABSTRACT

A wavelength device includes a substrate, a photoluminescence layer, a light spot adjusting layer, and a reflecting layer. The photoluminescence layer is disposed over the substrate, and is configured to receive incident light and convert the incident light to excitation light. The light spot adjusting layer is disposed between the substrate and the photoluminescence layer, and is configured to receive the excitation light and the unconverted incident light and to adjust the light path of the excitation light and the unconverted incident light, in which a refractive index of the photoluminescence layer is different from a refractive index of the light spot adjusting layer. The reflecting layer is disposed between the light spot adjusting layer, and is configured to reflect the incident light and the excitation light.

17 Claims, 8 Drawing Sheets

WAVELENGTH CONVERTING DEVICE

RELATED APPLICATION

This application claims priority to U.S. Provisional Application Ser. No. 63/021,665, filed May 7, 2020, which is herein incorporated by reference in its entirety.

BACKGROUND

Field of Invention

The present disclosure relates to a wavelength converting device.

Description of Related Art

In recent years, optical projectors have been widely used in many fields and in various places, such as schools, homes, and businesses.

In one kind of the projectors, a laser light source provides first light incident on a fluorescence material to emit second light. In this regard, the fluorescence material and a reflective material are coated on a wheel, and the wheel is driven to rotate at a high speed by a motor. An image is finally formed by light reflecting from the wheel. With an increasing demand for the brightness of the optical projectors, how to make the fluorescent material and the reflective material exert a better effect has become an important issue in the present.

SUMMARY

The disclosure relates in general to a wavelength converting device.

According to some embodiments of the present disclosure, the wavelength device includes a substrate, a photoluminescence layer, a light spot adjusting layer, and a reflecting layer. The photoluminescence layer is disposed over the substrate, and is configured to receive incident light and convert the incident light to excitation light. The light spot adjusting layer is disposed between the substrate and the photoluminescence layer, and is configured to receive the excitation light and the unconverted incident light and to adjust the light path of the excitation light and the unconverted incident light, in which a refractive index of the photoluminescence layer is different from a refractive index of the light spot adjusting layer. The reflecting layer is disposed between the light spot adjusting layer, and is configured to reflect the incident light and the excitation light.

In some embodiments of the present disclosure, a thermal conductivity of the light spot adjusting layer is between 0.1 W/m·K and 40 W/m·K.

In some embodiments of the present disclosure, the light spot adjusting layer includes a matrix and a plurality of light diffusion particles, and a refractive index of the matrix is different from a refractive index of the light diffusion particles.

In some embodiments of the present disclosure, the matrix includes a single crystal structure, a polycrystalline structure, a continuum structure, or combinations thereof.

In some embodiments of the present disclosure, the matrix includes silicone, glass, diamond, sapphire, yttrium oxide, sintered metal oxide, or combinations thereof.

In some embodiments of the present disclosure, the light diffusion particles include silicon dioxide, single crystal quartz, aluminum oxide, titanium oxide, yttrium oxide, sintered metal oxide, or combinations thereof.

In some embodiments of the present disclosure, based on a total weight of the light spot adjusting layer, a concentration of the light diffusion particles is between 10 wt. % and 70 wt. %.

In some embodiments of the present disclosure, a particle diameter of the light diffusion particles is between 10 nm and 10 μm.

In some embodiments of the present disclosure, a thermal conductivity of the light diffusion particles is larger than a thermal conductivity of the matrix.

In some embodiments of the present disclosure, the light spot adjusting layer further includes a plurality of first photoluminescence particles, and a refractive index of the first photoluminescence particles is larger than a refractive index of the matrix.

In some embodiments of the present disclosure, the photoluminescence layer includes a plurality of second photoluminescence particles, and a wavelength conversion efficiency of the first photoluminescence particles in the light spot adjusting layer is lower than a wavelength conversion efficiency of the second photoluminescence particles in the photoluminescence layer.

In some embodiments of the present disclosure, a wavelength conversion efficiency of the light spot adjusting layer is lower than a wavelength conversion efficiency of the photoluminescence layer by less than 80%.

In some embodiments of the present disclosure, the photoluminescence layer includes a plurality of second photoluminescence particles, and a particle diameter of the first photoluminescence particles is smaller than a particle diameter of the second photoluminescence particles.

In some embodiments of the present disclosure, the particle diameter of the first photoluminescence particles is between 1 μm and 20 μm, and the particle diameter of the second photoluminescence particles is between 20 μm and 35 μm.

In some embodiments of the present disclosure, a concentration of the first photoluminescence particles is between 40 wt. % and 80 wt. %, and a concentration of the second photoluminescence particles is between 70 wt. % and 90 wt. %.

In some embodiments of the present disclosure, a ratio of the concentration of the light diffusion particles to the concentration of the first photoluminescence particles is between 0.5 and 1.2.

In some embodiments of the present disclosure, a thickness of the light spot adjusting layer is between 10 μm and 500 μm, and a thickness of the photoluminescence layer is between 25 μm and 300 μm.

In the aforementioned embodiments of the present disclosure, since the light spot adjusting layer can prevent excessive concentration of light spots generated by the excitation light and the incident light in the photoluminescence layer, the light spots can be uniformly distributed in the photoluminescence layer. Accordingly, the wavelength converting device can exert better optical conversion efficiency and provide higher brightness and larger light emitting area. In addition, a thickness of the photoluminescence layer can be reduced, which is beneficial for the heat dissipation of the photoluminescence layer and the lightness of the wavelength converting device. Furthermore, the heat of high energy in the photoluminescence layer generated by the concentrated light spots can be reduced, and the service life of the wavelength converting device can be prolonged accordingly.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

As used herein, "around", "about", "approximately", or "substantially" shall generally mean within 20 percent, or within 10 percent, or within 5 percent of a given value or range. Numerical quantities given herein are approximated; meaning that the term "around", "about", "approximately", or "substantially" can be inferred if not expressly stated.

In order to prevent excessive concentration of light spots in the photoluminescence layer of the wavelength converting device, the present disclosure provides a wavelength converting device including a light spot adjusting layer. It is noted that when a light beam irradiates toward an object, a "light spot" will be generated on a surface of the object, and that the "concentration of light spot" herein refers to power of the light spot per unit area, which may be represented by the unit "W/cm$^2$". In other words, when the energy transfer rate of the light beam is constant, the larger the area of the light spot is, the lower the power of the light spot per unit area is, that is, the lower the concentration of light spot is. By adjusting the characteristics of the light spot adjusting layer and the particles in the light spot adjusting layer, the ability of preventing excessive concentration of light spots on the wavelength converting device is well achieved. Accordingly, the light spots can be uniformly distributed in the photoluminescence layer, which means the photoluminescence particles (e.g., the phosphors) in the photoluminescence layer can be utilized effectively, and hence the wavelength converting device can exert better optical conversion efficiency and provide higher brightness and larger light emitting area. In addition, since the photoluminescence particles in the photoluminescence layer can be utilized effectively, a thickness of the photoluminescence layer can be reduced, which is beneficial for the heat dissipation of the photoluminescence layer and the lightness of the wavelength converting device. Furthermore, the heat of high energy in the photoluminescence layer generated by the concentrated light spots can be reduced, and the service life of the wavelength converting device can be prolonged accordingly.

Figure 1:
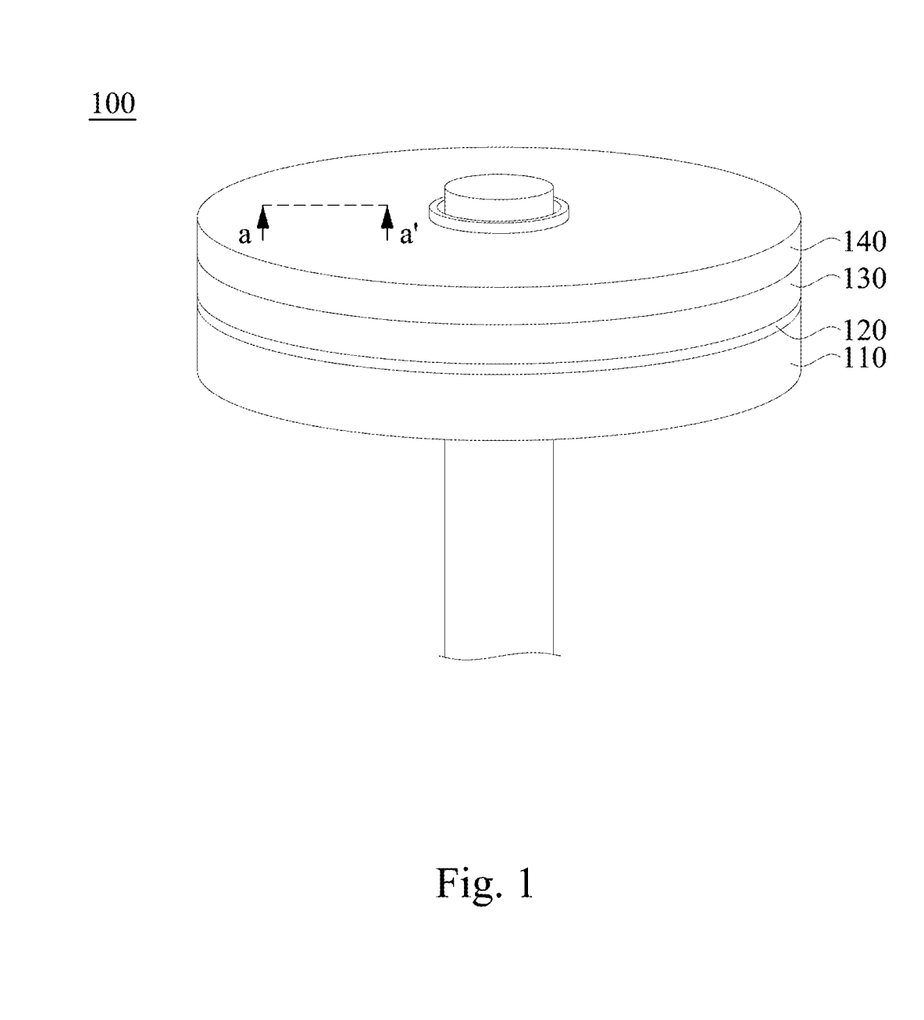
FIG. 1 is a perspective view illustrating a wavelength converting device according to some embodiments of the present disclosure.
Figure 2:
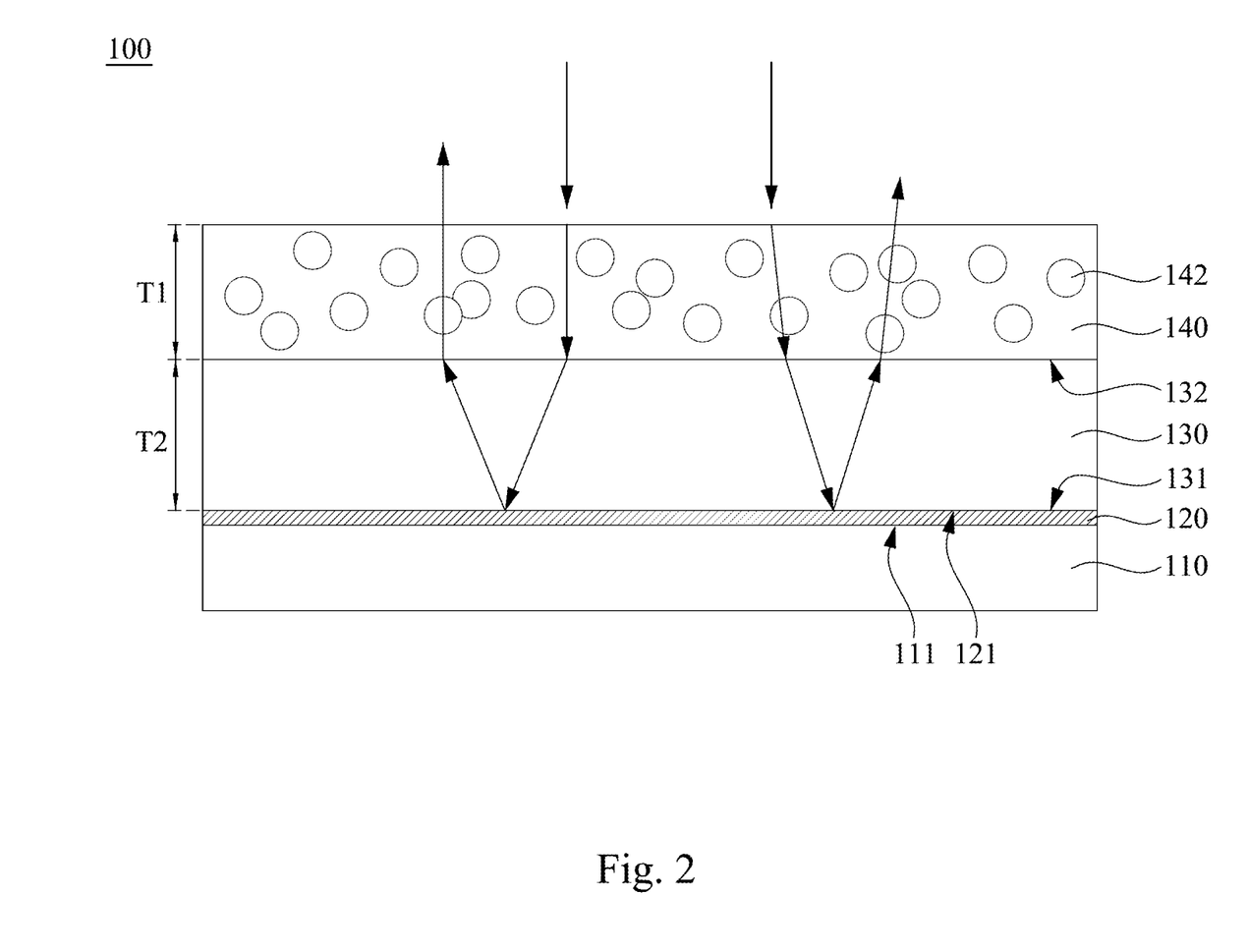
FIG. 2 is a cross-sectional view of the wavelength converting device shown in FIG. 1 along line a-a' according to some embodiments of the present disclosure.

FIG. 1 is a perspective view illustrating a wavelength converting device 100 according to some embodiments of the present disclosure. FIG. 2 is a cross-sectional view of the wavelength converting device 100 shown in FIG. 1 along line a-a' according to some embodiments of the present disclosure. Reference is made to FIG. 1 and FIG. 2. The wavelength converting device 100 includes a substrate 110, a reflecting layer 120, a light spot adjusting layer 130, and a photoluminescence layer 140. The light spot adjusting layer 130 has a first surface 131 and a second surface 132 facing away from the first surface 131. The substrate 110 is on the first surface 131 of the light spot adjusting layer 130, and the photoluminescence layer 140 is on the second surface 132 of the light spot adjusting layer 130. Stated differently, the substrate 110 and the photoluminescence layer 140 are on opposite sides of the light spot adjusting layer 130. In addition, the reflecting layer 120 is disposed between the light spot adjusting layer 130 and the substrate 110. In some embodiments, the wavelength converting device 100 is a reflective fluorescent phosphor wheel, which generates excitation light by the absorption of a light beam (e.g., laser light). In detail, the light beam is absorbed by the photoluminescence layer 140 to generate the excitation light, some of which is further entered into and diffused in the light spot adjusting layer 130, and then is able to be reflected by the reflecting layer 120 and emitted out of the wavelength converting device 100 for imaging. In some embodiments, the wavelength converting device 100 is connected to a motor through a driving shaft, such that the wavelength converting device 100 can be rotated when the motor drives the driving shaft to rotate.

In some embodiments, the substrate 110 may be, for example, a sapphire substrate, a glass substrate, a borosilicate glass substrate, a floating boron-silicate glass substrate, a fused quartz substrate or a calcium fluoride substrate, a ceramic substrate, an aluminum substrate, or combinations thereof. However, the materials included in the substrate 110 are not limited thereto, and the materials included in the substrate 110 can be adjusted according to actual needs.

In some embodiments, the reflecting layer 120 may be made of a material including metal (e.g., silver or/and aluminum), such that the reflecting layer 120 may have a metallic reflecting surface 121 facing away from the substrate 110, so as to enhance the reflection of the light beam irradiated toward the substrate 110, and further provide the wavelength converting device 100 with better optical conversion efficiency. In some other embodiments, the reflecting layer 120 may include scattering particles such as titanium oxide and/or zirconium oxide. In some other embodiments, the reflecting layer 120 may be a metal oxide plate including a material such as aluminum oxide and/or beryllium oxide. In alternative embodiments, the reflecting layer 120 may include multilayer dielectric films made of materials such as silicon oxide and aluminum oxide.

In some embodiments, the light spot adjusting layer 130 can adjust a concentration of the light spots in the photoluminescence layer 140. In some embodiments, the light spot adjusting layer 130 may adjust the concentration of the light spots generated by the excitation light in the photoluminescence layer 140. In detail, when excitation light is converted from incident light and transmitted through an interface between the photoluminescence layer 140 and the light spot adjusting layer 130, the excitation light may then be diffused into the light spot adjusting layer 130 and/or reflected by the light spot adjusting layer 130 due to a difference in reflective index between the photoluminescence layer 140 and the light spot adjusting layer 130. The excitation light diffused into the light spot adjusting layer 130 is then further reflected back to the light spot adjusting layer 130 and the photoluminescence layer 140 by the reflecting layer 120. Accordingly, the excitation light can be transmitted in the wavelength converting device 100 through diversified light paths, and the light paths for the excitation light to be transmitted in the wavelength converting device 100 become longer. As such, the excitation light can be diffused toward the photoluminescence layer 140 with a low distribution density to reduce the concentration of the light spots in the photoluminescence layer 140. In some embodiments, a refractive index of the photoluminescence layer 140 is different from a refractive index of the light spot adjusting layer 130, such that the light path can be well adjusted at the interface between the photoluminescence layer 140 and the light spot adjusting layer 130. In preferred embodiments, the refractive index of the light spot adjusting layer 130 is larger than the refractive index of the photoluminescence layer 140.

In some other embodiments, the light spot adjusting layer 130 may adjust the concentration of the light spots generated by the incident light which is not being converted into the excitation light in the photoluminescence layer 140. In detail, when an incident light is transmitted through the photoluminescence layer 140 to reach an interface between the photoluminescence layer 140 and the light spot adjusting layer 130 without being converted into the excitation light, the incident light may then be diffused into the light spot adjusting layer 130 and/or reflected by the light spot adjusting layer 130 due to a difference in reflective index between the photoluminescence layer 140 and the light spot adjusting layer 130. The incident light diffused into the light spot adjusting layer 130 is then further reflected back to the light spot adjusting layer 130 and the photoluminescence layer 140 by the reflecting layer 120. Accordingly, the incident light can be transmitted in the wavelength converting device 100 through diversified light paths, and the light paths for the incident light to be transmitted in the wavelength converting device 100 become longer. As such, the incident light is diffused toward the photoluminescence layer 140 with a low distribution density to reduce the concentration of the light spots in the photoluminescence layer 140.

Since the light spot adjusting layer 130 can prevent excessive concentration of light spots generated by the excitation light and the incident light in the photoluminescence layer 140, the light spots can be uniformly distributed in the photoluminescence layer 140. Accordingly, the photoluminescence particles 142 (e.g., phosphors such as cerium phosphors) in the photoluminescence layer 140 can be utilized effectively, and hence the wavelength converting device 100 can exert better optical conversion efficiency and provide higher brightness and larger light emitting area. In addition, since the photoluminescence particles 142 in the photoluminescence layer 140 can be utilized effectively, a thickness T1 of the photoluminescence layer 140 can be reduced, which is beneficial for the heat dissipation of the photoluminescence layer 140 and the lightness of the wavelength converting device 100. For example, the thickness T1 of the photoluminescence layer 140 can be between 25 µm and 300 µm. Furthermore, the heat of high energy in the photoluminescence layer 140 generated by the concentrated light spots can be reduced, and the service life of the wavelength converting device 100 can be prolonged accordingly.

In some embodiments, a thickness T2 of the light spot adjusting layer 130 may be between 10 µm and 500 µm, such that the light (including the excitation light and the incident light) can be well guided and uniformly transmitted to the photoluminescence layer 140, and a total thickness of the wavelength converting device 100 can be kept in an appropriate range. In detail, if the thickness T2 of the light spot adjusting layer 130 is smaller than 10 µm, the light spots in the photoluminescence layer 140 may be too concentrated, which may further cause a bad influence on the optical conversion efficiency and the brightness as well as the heat dissipation; and if the thickness T2 of the light spot adjusting layer 130 is larger than 500 µm, the total thickness of the wavelength converting device 100 may be too large, which not only affects the appearance of the wavelength converting device 100 but also results in material waste.

In some embodiments, the light spot adjusting layer 130 may be made of a material including a single crystal structure, a polycrystalline structure, a continuum structure, or combinations thereof. The light (including the excitation light and the incident light) can be well diffused by the aforementioned materials to the photoluminescence layer 140, such that the reflected incident light may have more chances to encounter the phosphors in the photoluminescence layer 140 and being converted into the excitation light, and the excessive concentration of light spots in the photoluminescence layer 140 can also be prevented. In some embodiments, the light spot adjusting layer 130 may be made of a material including silicone, glass, diamond, sapphire, yttrium oxide, sintered metal oxide, or combinations thereof. The aforementioned materials may be transparent, substantially transparent (i.e., light transmittance in visible light is larger than 90%), or semi-transparent (i.e., light transmittance in visible light is between 30% and 90%). The aforementioned materials can provide the light spot adjusting layer 130 with a thermal conductivity between 0.1 W/m·K and 40 W/m·K. If the thermal conductivity of the light spot adjusting layer 130 is smaller than 0.1 W/m·K, the light spot adjusting layer 130 may not be able to effectively conduct the heat, which leads to thermal degradation to the photoluminescence layer 140. Furthermore, for the sake of a better heat dissipation effect, the thermal conductivity of the light spot adjusting layer 130 may be larger than 10 W/m·K.

In some embodiments, the aforementioned photoluminescence particles 142 in the photoluminescence layer 140 may include silicate phosphors, nitride phosphors, cerium phosphors, $Y_3Al_5O_{12}$ (YAG), $Tb_3Al_5O_{12}$ (TAG), or $Lu_3Al_5O_{12}$ (LuAG) phosphors with garnet structures, or combinations thereof, but the present disclosure is not limited in this regard.

Figure 3:
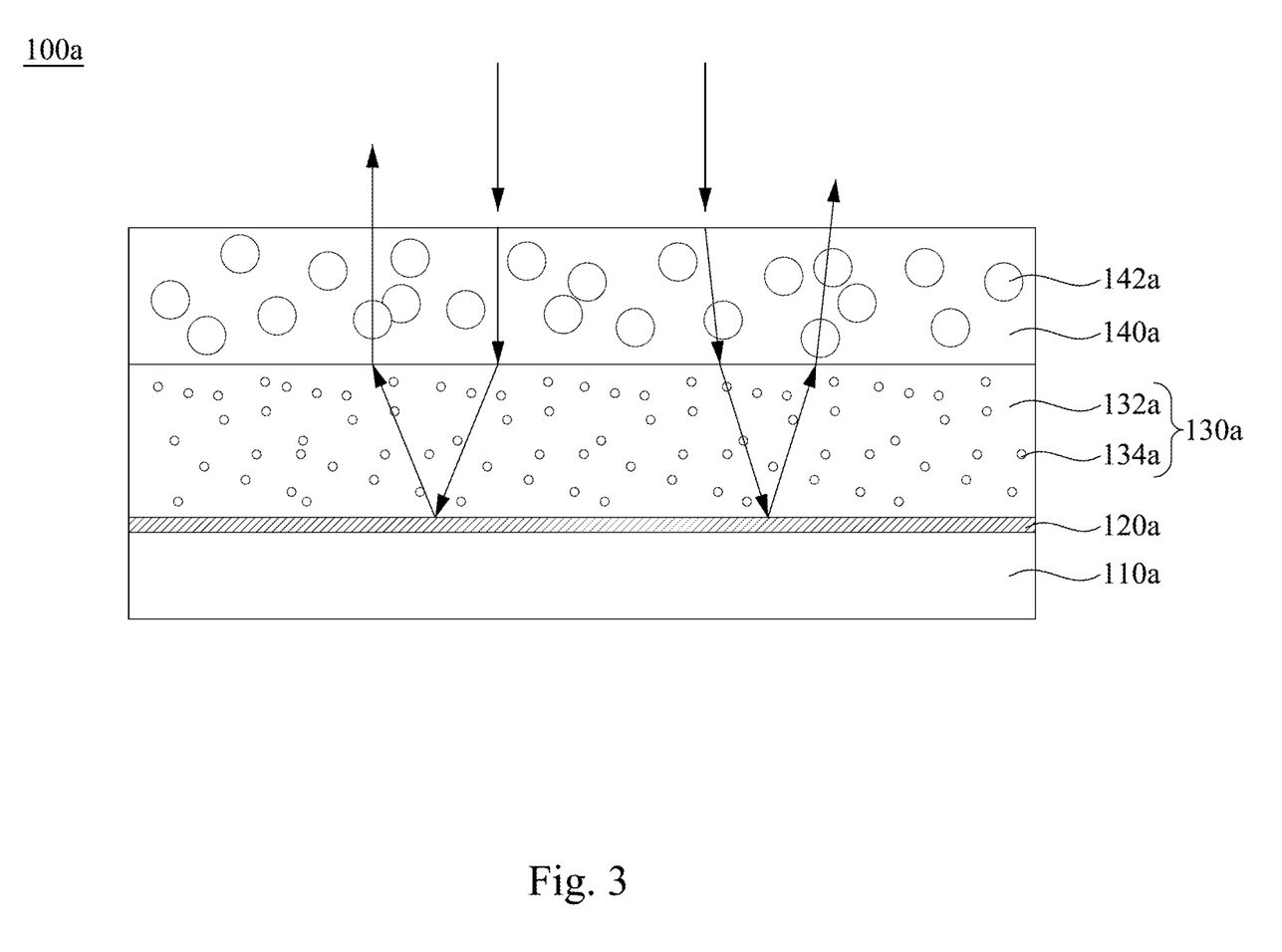
FIG. 3 is a cross-sectional view of the wavelength converting device shown in FIG. 1 along line a-a' according to some other embodiments of the present disclosure.

FIG. 3 is a cross-sectional view of the wavelength converting device 100 shown in FIG. 1 along line a-a' according to some other embodiments of the present disclosure (which will be referred to as the wavelength converting device 100a hereinafter). Reference is made to FIG. 3. At least one difference between the wavelength converting device 100a shown in FIG. 3 and the wavelength converting device 100 shown in FIG. 2 lies in that the light spot adjusting layer 130a of the wavelength converting device 100a includes a matrix 132a and a plurality of light diffusion particles 134a distributed in the matrix 132a. The light diffusion particles 134a are configured to adjust the degree of light diffusion.

In detail, the light diffusion particles 134a can adjust the light path, so as to prevent the light emitted toward the photoluminescence layer 140a from being excessively divergent. Accordingly, the light emitted toward the photoluminescence layer 140a can be appropriately converged, which is beneficial for the collection of the light. In such an embodiment, not only the problem of the excessive concentration of light spots can be avoided, but also the collection of the light from the wavelength converting device 100a can be easily achieved.

In some embodiments, a material of the matrix 132a can be referred to the material of the aforementioned light spot adjusting layer 130 of the wavelength converting device 100. In some embodiments, a material of the light diffusion particles 134a may include silicon dioxide, single crystal quartz, aluminum oxide, titanium oxide, yttrium oxide, sintered metal oxide, or combinations thereof. In some embodiments, a refractive index of the matrix 132a is different from a refractive index of the light diffusion particles 134a, such that the light path in the light spot adjusting layer 130a can be well adjusted at the interfaces between the matrix 132a and the light diffusion particles 134a. In preferred embodiments, the refractive index of the light diffusion particles 134a is larger than the refractive index of the matrix 132a. In some embodiments, based on a total weight of the light spot adjusting layer 130a, a concentration of the light diffusion particles 134a is between 10 wt. % and 70 wt. % to achieve better adjustment of the light path in the light spot adjusting layer 130a. In detail, if the concentration of the light diffusion particles 134a is lower than 10 wt. %, the light path may not be well adjusted, and the light emitted toward the photoluminescence layer 140a may be excessively divergent, which leads to difficulties in collecting the light; and if the concentration of the light diffusion particles 134a is higher than 70 wt. %, the diffusion effect of the light may not be well achieved, and the above advantages (e.g., prevent excessive concentration of light spots and avoid the excessive divergence of the light) may not be well achieved.

In some embodiments, a particle diameter (D50) of the light diffusion particles 134a is between 10 nm and 10 μm to achieve better adjustment of the light path in the light spot adjusting layer 130a. It is noted that the "particle diameter (D50)" herein refers to the particle size of the light diffusion particles 134a when the particle size distribution percentage of a light diffusion particles 134a reaches 50%, that is, a half of the light diffusion particles 134a has a particle diameter larger than the particle diameter (D50), and a half of the light diffusion particles 134a has a particle diameter smaller than particle diameter (D50). In detail, if the particle diameter (D50) of the light diffusion particles 134a is smaller than 10 nm, the light in the light spot adjusting layer 130a may not easily encounter the light diffusion particles 134a, and hence the light path may not be well adjusted, which leads to difficulties in collecting the light; and if the particle diameter (D50) of the light diffusion particles 134a is larger than 10 μm, the light diffusion particles 134a may severely influence the transmission of the light in the light spot adjusting layer 130a, such that the diffusion of the light may be too complicated, and the above advantages (e.g., prevent excessive concentration of light spots and avoid the excessive divergence of the light) may not be well achieved. In some embodiments, a thermal conductivity of the matrix 132a can be referred to the thermal conductivity of the aforementioned light spot adjusting layer 130, such that the light spot adjusting layer 130a can have a good heat thermal conductivity to efficiently conduct the heat which may cause the thermal quenching effect to the phosphors in the photoluminescence layer 140a, and that the service life of the wavelength converting device 100a can be prolonged. In some embodiments, a thermal conductivity of the light diffusion particles 134a may be larger than 1.5 W/m·K, so as to further provide the light spot adjusting layer 130a with good heat thermal conductivity. In some other embodiments, the thermal conductivity of the light diffusion particles 134a may be larger than the thermal conductivity of the matrix 132a.

Figure 4:
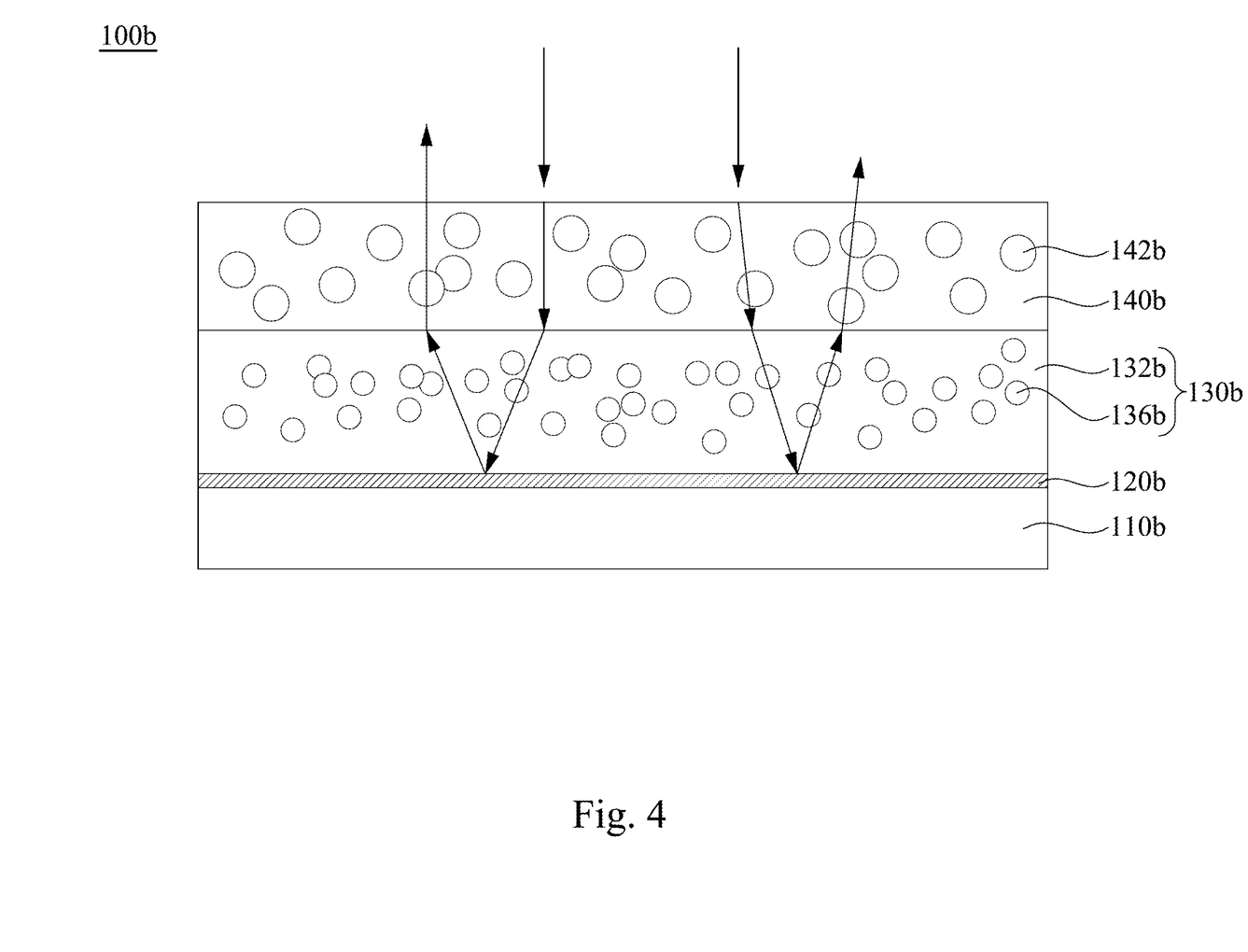
FIG. 4 is a cross-sectional view of the wavelength converting device shown in FIG. 1 along line a-a' according to some other embodiments of the present disclosure.

FIG. 4 is a cross-sectional view of the wavelength converting device 100 shown in FIG. 1 along line a-a' according to some other embodiments of the present disclosure (which will be referred to as the wavelength converting device 100b hereinafter). Reference is made to FIG. 4. At least one difference between the wavelength converting device 100b shown in FIG. 4 and the wavelength converting device 100 shown in FIG. 2 lies in that the light spot adjusting layer 130b of the wavelength converting device 100b includes a matrix 132b and a plurality of photoluminescence particles 136b distributed in the matrix 132b. For the sake of simplicity and clarity, the photoluminescence particles 136b in the light spot adjusting layer 130b are referred to as the first photoluminescence particles 136b, and the photoluminescence particles 142b in the photoluminescence layer 140b are referred to as the second photoluminescence particles 142b hereinafter. The first photoluminescence particles 136b are configured to further convert the incident light transmitted to the light spot adjusting layer 130b into the excitation light. Accordingly, the brightness of the wavelength converting device 100b can further be enhanced. In addition, the first photoluminescence particles 136b are also configured to adjust the degree of light diffusion, which perform a function identical to the aforementioned light diffusion particles 134a. In some embodiments, a ratio of a concentration of the light diffusion particles 134a to a concentration of the first photoluminescence particles 136b is between 0.5 and 1.2. Accordingly, the light emitted toward the photoluminescence layer 140b can be appropriately converged, which is beneficial for the collection of the light. In such an embodiment, the brightness of the wavelength converting device 100b can further be enhanced compared to the wavelength converting device 100a shown in FIG. 3.

In some embodiments, a refractive index of the first photoluminescence particles 136b is larger than a refractive index of the matrix 132b, such that the incident light transmitted from the photoluminescence layer 140b to the light spot adjusting layer 130b has a higher chance to be reflected back to the photoluminescence layer 140b. Accordingly, the light being converted into the excitation light in the light spot adjusting layer 130b can be effectively reflected outward the wavelength converting device 100b.

In some embodiments, a concentration of the first photoluminescence particles 136b in the light spot adjusting layer 130b is lower than a concentration of the second photoluminescence particles 142b in the photoluminescence layer 140b, and a particle diameter of each of the first photoluminescence particles 136b in the light spot adjusting layer 130b is smaller than a particle diameter of each of the second photoluminescence particles 142b in the photoluminescence layer 140b. Specifically, a concentration of the first photoluminescence particles 136b in the light spot adjusting layer 130b is between 40 wt. % and 80 wt. %, and a concentration of the second photoluminescence particles 142b in the photoluminescence layer 140b is between 70 wt. % and 90 wt. %. In addition, the particle diameter of the first photoluminescence particles 136b is between 1 μm and 20

μm, and the particle diameter of the second photoluminescence particles 142b is between 20 μm and 35 μm. Accordingly, a wavelength conversion efficiency (i.e., the luminous flux per unit volume) of the first photoluminescence particles 136b in the light spot adjusting layer 130b is lower than a wavelength conversion efficiency of the second photoluminescence particles 142b in the photoluminescence layer 140b. In addition, a wavelength conversion efficiency of the light spot adjusting layer 130b is lower than a wavelength conversion efficiency of the photoluminescence layer 140b by less than 80%. As such, most of the light can be converted into the excitation light by the photoluminescence layer 140b, and that the light spot adjusting layer 130b can mainly play a role of adjusting the concentration of the light spots. More specifically, since the concentration of the first photoluminescence particles 136b in the light spot adjusting layer 130b is relatively low, and the particle diameter of each of the first photoluminescence particles 136b is relatively small, the light transmitted into the light spot adjusting layer 130b may be relatively difficult to encounter the first photoluminescence particles 136b and hence the light has more chance to be simply diffused by the matrix 132b in the light spot adjusting layer 130b, which can well achieve the advantages of the wavelength converting device 100 shown in FIG. 2. In some embodiments, a wavelength of the first photoluminescence particles 136b can be designed to be different from a wavelength of the second photoluminescence particles 142b as deemed necessary by the actual needs of the wavelength converting device 100b.

Figure 5:
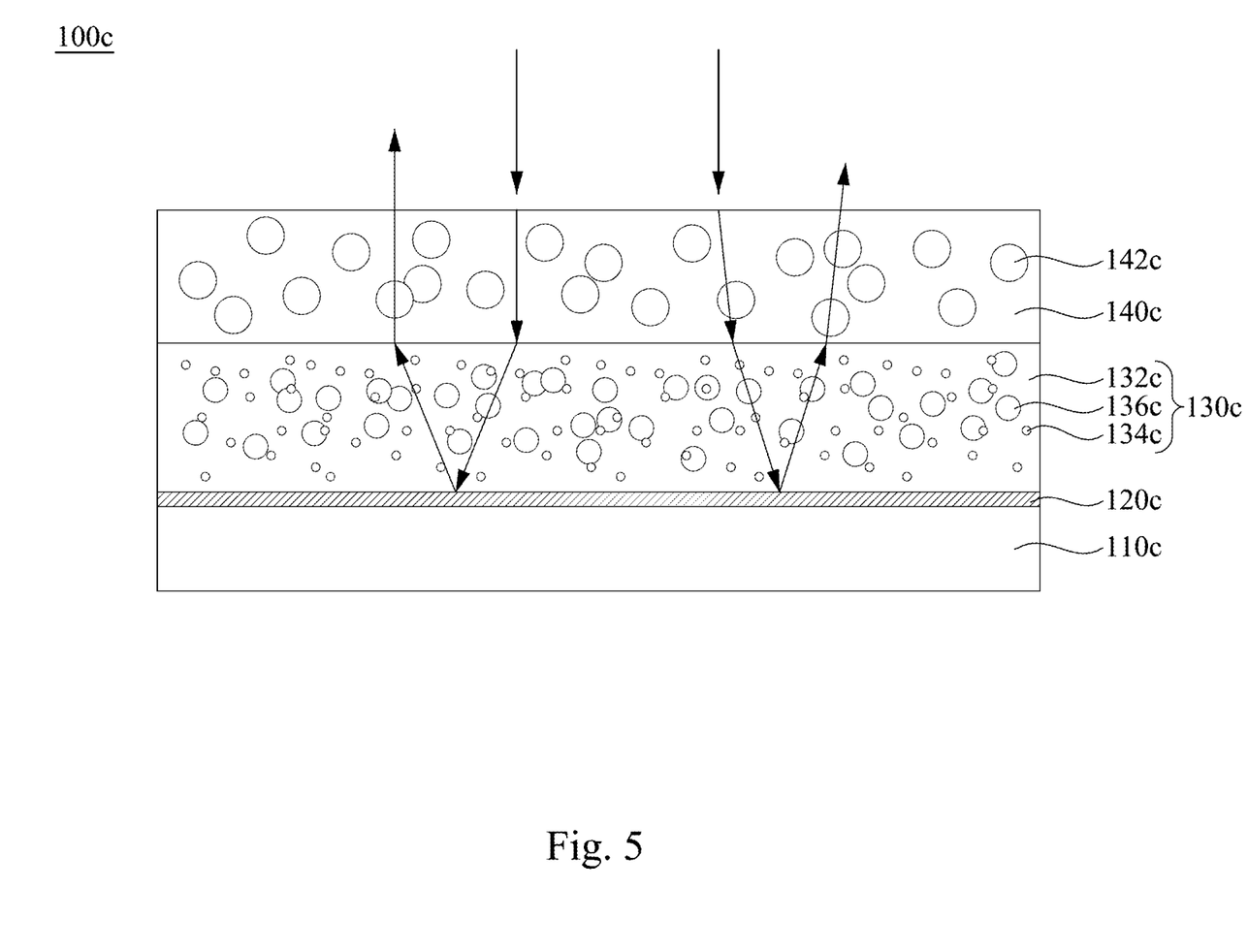
FIG. 5 is a cross-sectional view of the wavelength converting device shown in FIG. 1 along line a-a' according to some other embodiments of the present disclosure.

FIG. 5 is a cross-sectional view of the wavelength converting device 100 shown in FIG. 1 along line a-a' according to some other embodiments of the present disclosure (which will be referred to as the wavelength converting device 100c hereinafter). Reference is made to FIG. 5. At least one difference between the wavelength converting device 100c shown in FIG. 5 and the wavelength converting device 100b shown in FIG. 4 lies in that the light spot adjusting layer 130c of the wavelength converting device 100c further includes a plurality of the light diffusion particles 134c. In other words, the light spot adjusting layer 130c of the wavelength converting device 100c includes both the light diffusion particles 134c and the first photoluminescence particles 136c. In some embodiments, a concentration of the light diffusion particles 134c and a concentration of the first photoluminescence particles 136c are both lower than a concentration of the second photoluminescence particles 142c in the photoluminescence layer 140c, such that the aforementioned advantages (e.g., the advantages mentioned in the discussion of the wavelength converting device 100b) can be well achieved. For example, based on a total weight of the light spot adjusting layer 130c, the concentration of the light diffusion particles 134c and the concentration of the first photoluminescence particles 136c are respectively between 20 wt. % and 30 wt. %, and based on a total weight of the photoluminescence layer 140c, the concentration of the second photoluminescence particles 142c is between 70 wt. % and 90 wt. %.

In some embodiments, a particle diameter of each of the light diffusion particles 134c and a particle diameter of each of the first photoluminescence particles 136c in the light spot adjusting layer 130c are both smaller than a particle diameter of each of the second photoluminescence particles 142c in the photoluminescence layer 140c, such that the aforementioned advantages (e.g., the advantages mentioned in the discussion of the wavelength converting device 100b) can be well achieved. In such an embodiment, the light diffusion particles 134c may include a material with a high thermal conductivity, such as titanium dioxide ($TiO_2$). Since the material of the light diffusion particles 134c has a high thermal conductivity, the heat generated by the thermal quenching effect of the phosphors can further be efficiently conducted from the photoluminescence layer 140c to the substrate 110c. In some embodiments, the thermal conductivity of the light diffusion particles 134c may be between 0.1 W/m·K and 40 W/m·K, so as to better conduct the heat generated by the thermal quenching effect of the phosphors, and further prevent the photoluminescence layer 140c from thermal degradation.

Hereinafter, the features of the present disclosure will be described more specifically with reference to the wavelength converting devices of a comparative example and some embodiments of the present disclosure. It should be noted that without exceeding the scope of the present disclosure, the materials used, quality and ratio, processing details, and processing procedures may be changed as appropriate. Therefore, the present disclosure should not be interpreted restrictively by the wavelength converting devices of the embodiments described below. The wavelength converting devices of the comparative example and the embodiments and their output light intensities are listed in Table 1 reproduced below, in which the comparative example refers to a wavelength converting device without having the light spot adjusting layer, and the embodiments 1, 2, and 3 respectively refer to the wavelength converting device 100, 100a, and 100b.

TABLE 1

| input light (wavelength) | output light intensity (output light intensity of the comparative example 1 is defined as 100%) | | | |
|---|---|---|---|---|
| | comparative example 1 | embodiment 1 | embodiment 2 | embodiment 3 |
| yellow (460-700 nm) | 100% | 102.8% | 102.3% | 105.8% |
| green (460-590 nm) | 100% | 102.3% | 101.5% | 104.5% |
| red (590-700 nm) | 100% | 103.6% | 103.6% | 108.0% |

As shown in Table 1, the output light intensity of each of the embodiments 1, 2, and 3 is higher than the output light intensity of the comparative example 1, indicating that through the configuration of the light spot adjusting layer in the present disclosure, the light spots can be uniformly distributed in the photoluminescence layer, which means almost each of the photoluminescence particles in the photoluminescence layer can be utilized effectively, and hence the wavelength converting device can exert better optical conversion efficiency and provide higher brightness (i.e., higher output light intensity). In addition, although the light intensity of embodiment 2 is slightly lower than the light intensity of embodiment 1, the light diffusion particles in embodiment 2 can adjust the degree of light diffusion as mentioned previously, such that the collection of the light is well achieved. Furthermore, since the light spot adjusting layer of embodiment 3 further includes the photoluminescence particles configured to convert the incident light into the excitation light, embodiment 3 shows the highest light intensity among the embodiments shown in Table 1.

Figure 6:
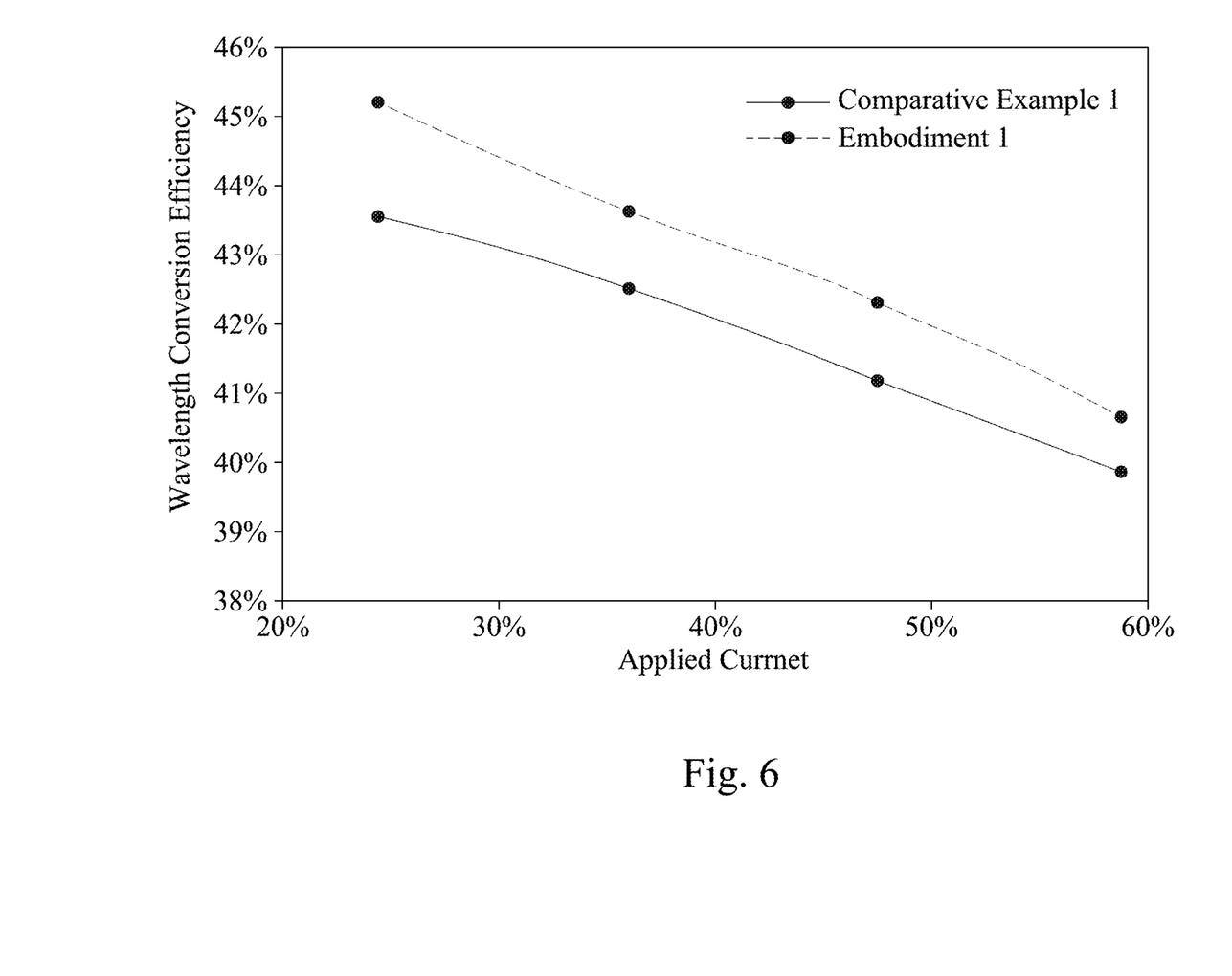
FIG. 6 is a diagram illustrating the wavelength conversion efficiency to the applied current of the wavelength converting devices of comparative example 1 and embodiment 1.

FIG. 6 is a diagram illustrating the wavelength conversion efficiency to the applied current of the wavelength converting devices of comparative example 1 and embodiment 1.

Figure 7:
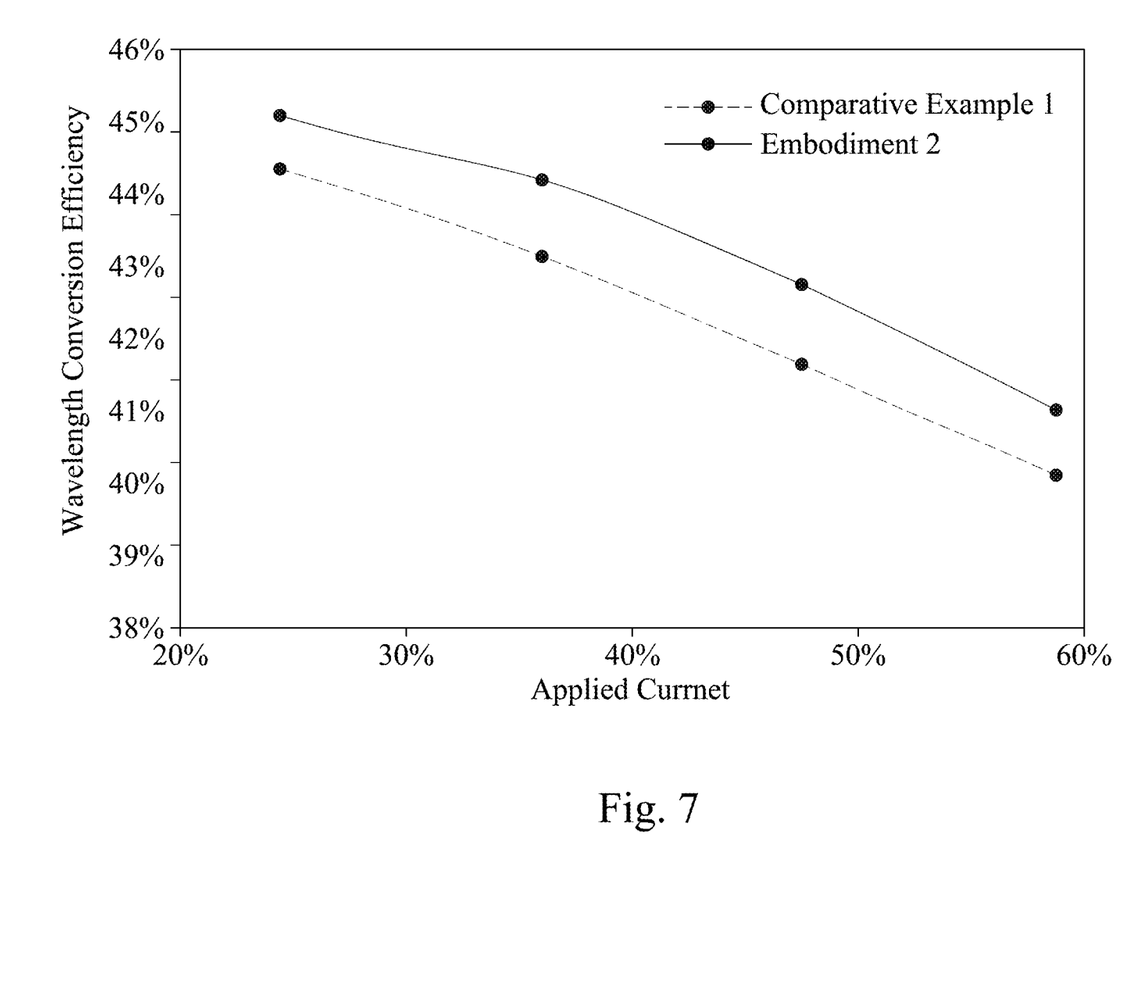
FIG. 7 is a diagram illustrating the wavelength conversion efficiency to the applied current of the wavelength converting devices of comparative example 1 and embodiment 2.
Figure 8:
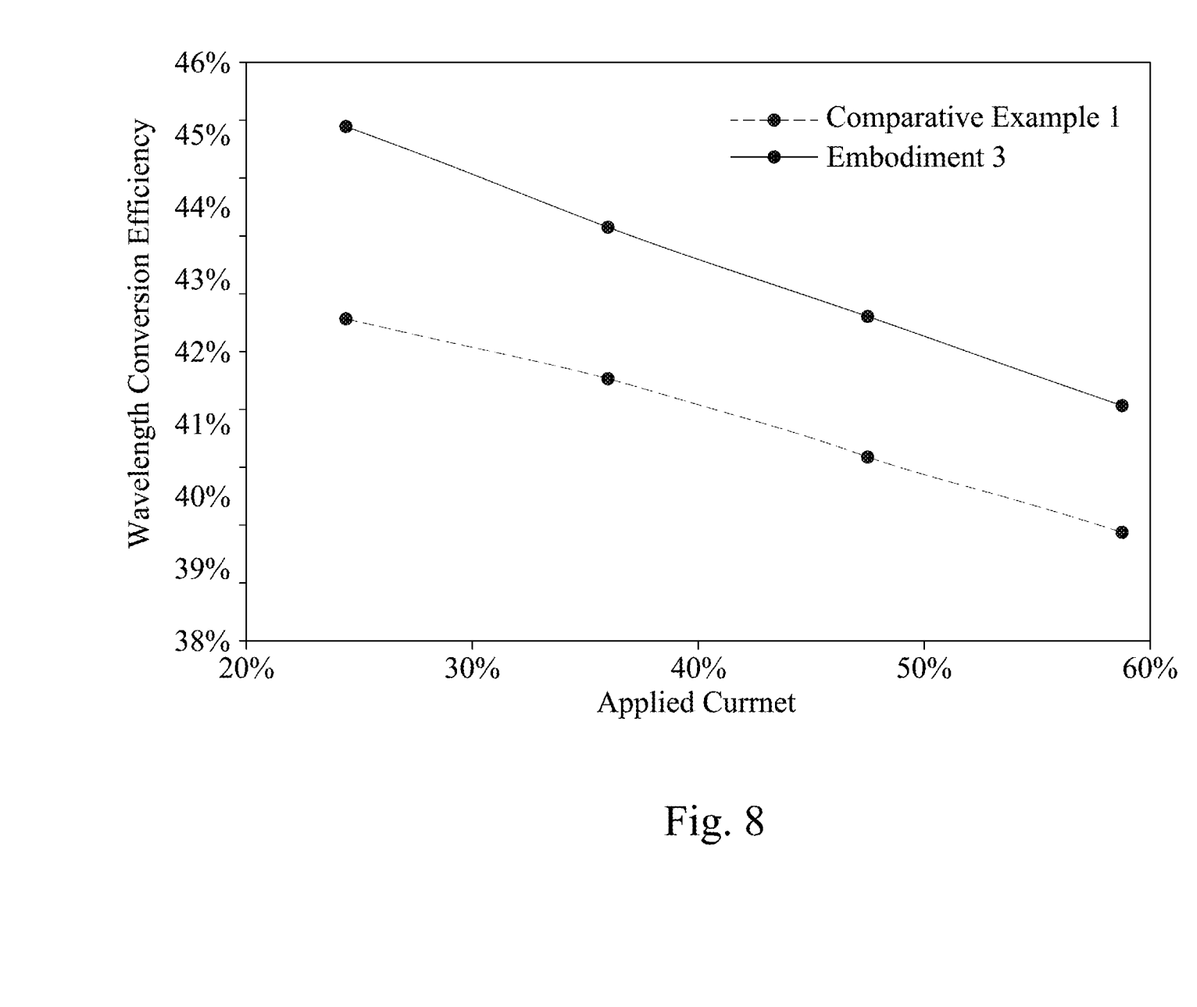
FIG. 8 is a diagram illustrating the wavelength conversion efficiency to the applied current of the wavelength converting devices of comparative example 1 and embodiment 3.

FIG. 7 is a diagram illustrating the wavelength conversion efficiency to the applied current of the wavelength converting devices of comparative example 1 and embodiment 2. FIG. 8 is a diagram illustrating the wavelength conversion efficiency to the applied current of the wavelength converting devices of comparative example 1 and embodiment 3. Reference is made to FIG. 6 to FIG. 8. When the applied current is 20% to 60% of the total applied current, the wavelength conversion efficiency of each of the embodiments 1-3 is higher than the wavelength conversion efficiency of comparative example 1, indicating that the light spot adjusting layer in the present disclosure can prevent excessive concentration of light spots, such that the light spots can be uniformly distributed in the photoluminescence layer and hence the wavelength converting device can exert better optical conversion efficiency.

According to the aforementioned embodiments of the present disclosure, since the light spot adjusting layer can prevent excessive concentration of light spots is well achieved, the light spots can be uniformly distributed in the photoluminescence layer, which means almost each of the photoluminescence particles in the photoluminescence layer can be utilized effectively, and hence the wavelength converting device can exert better optical conversion efficiency and provide higher brightness and larger light emitting area. In addition, since almost each of the photoluminescence particles in the photoluminescence layer can be utilized effectively, a thickness of the photoluminescence layer can be reduced, which is beneficial for the heat dissipation of the photoluminescence layer and the lightness of the wavelength converting device. Furthermore, the heat of high energy in the photoluminescence layer generated by the concentrated light spots can be reduced, and the service life of the wavelength converting device can be prolonged accordingly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A wavelength converting device, comprising:
a substrate;
a photoluminescence layer disposed over the substrate, and configured to receive incident light and convert the incident light to excitation light;
a light spot adjusting layer disposed between the substrate and the photoluminescence layer, and configured to receive the excitation light and the unconverted incident light and to adjust the light path of the excitation light and the unconverted incident light, wherein a refractive index of the photoluminescence layer is different from a refractive index of the light spot adjusting layer; and
a reflecting layer disposed between the light spot adjusting layer and the substrate, and configured to reflect the incident light and the excitation light.

2. The wavelength converting device of claim 1, wherein a thermal conductivity of the light spot adjusting layer is between 0.1 W/m·K and 40 W/m·K.

3. The wavelength converting device of claim 1, wherein the light spot adjusting layer comprises a matrix and a plurality of light diffusion particles, and a refractive index of the matrix is different from a refractive index of the light diffusion particles.

4. The wavelength converting device of claim 3, wherein the matrix comprises a single crystal structure, a polycrystalline structure, a continuum structure, or combinations thereof.

5. The wavelength converting device of claim 3, wherein the matrix comprises silicone, glass, diamond, sapphire, yttrium oxide, sintered metal oxide, or combinations thereof.

6. The wavelength converting device of claim 3, wherein the light diffusion particles comprise silicon dioxide, single crystal quartz, aluminum oxide, titanium oxide, yttrium oxide, sintered metal oxide, or combinations thereof.

7. The wavelength converting device of claim 3, wherein based on a total weight of the light spot adjusting layer, a concentration of the light diffusion particles is between 10 wt. % and 70 wt. %.

8. The wavelength converting device of claim 3, wherein a particle diameter of the light diffusion particles is between 10 nm and 10 μm.

9. The wavelength converting device of claim 3, wherein a thermal conductivity of the light diffusion particles is larger than a thermal conductivity of the matrix.

10. The wavelength converting device of claim 3, wherein the light spot adjusting layer further comprises a plurality of first photoluminescence particles, and a refractive index of the first photoluminescence particles is larger than a refractive index of the matrix.

11. The wavelength converting device of claim 10, wherein the photoluminescence layer comprises a plurality of second photoluminescence particles, and a wavelength conversion efficiency of the first photoluminescence particles in the light spot adjusting layer is lower than a wavelength conversion efficiency of the second photoluminescence particles in the photoluminescence layer.

12. The wavelength converting device of claim 11, wherein a wavelength conversion efficiency of the light spot adjusting layer is lower than a wavelength conversion efficiency of the photoluminescence layer by less than 80%.

13. The wavelength converting device of claim 10, wherein the photoluminescence layer comprises a plurality of second photoluminescence particles, and a particle diameter of the first photoluminescence particles is smaller than a particle diameter of the second photoluminescence particles.

14. The wavelength converting device of claim 13, wherein the particle diameter of the first photoluminescence particles is between 1 μm and 20 μm, and the particle diameter of the second photoluminescence particles is between 20 μm and 35 μm.

15. The wavelength converting device of claim 13, wherein a concentration of the first photoluminescence particles is between 40 wt. % and 80 wt. %, and a concentration of the second photoluminescence particles is between 70 wt. % and 90 wt. %.

16. The wavelength converting device of claim 10, wherein a ratio of a concentration of the light diffusion particles to a concentration of the first photoluminescence particles is between 0.5 and 1.2.

17. The wavelength converting device of claim 1, wherein a thickness of the light spot adjusting layer is between 10 μm and 500 μm, and a thickness of the photoluminescence layer is between 25 μm and 300 μm.

\* \* \* \* \*